Nov. 20, 1934.  R. J. HOFFMAN  1,981,700
AIRCRAFT
Filed Sept. 18, 1933
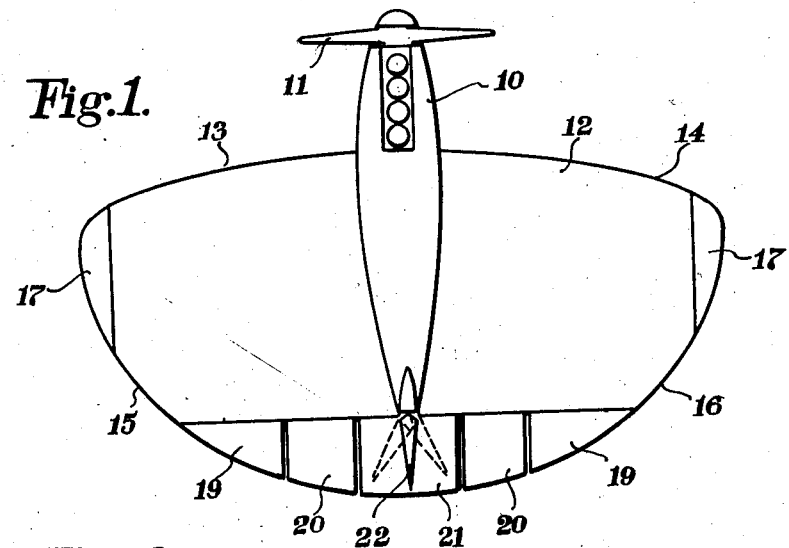
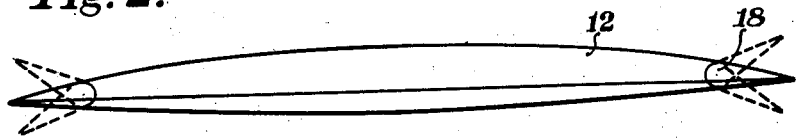
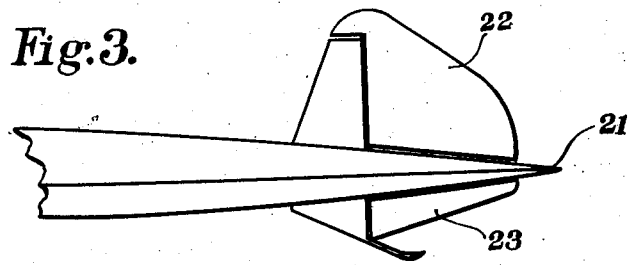
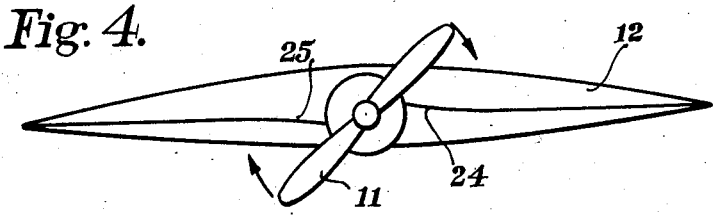
RAOUL J. HOFFMAN
*INVENTOR*
BY *James R. McKnight*
ATTORNEY Patented Nov. 20, 1934

1,981,700

UNITED STATES PATENT OFFICE 1,981,700

AIRCRAFT

Raoul J. Hoffman, Chicago, Ill., assignor of one-half to J. L. Younghusband, Chicago, Ill.

Application September 18, 1933, Serial No. 689,822

1 Claim. (Cl. 244—12)

My invention relates to a flying wing control unit wherein I locate substantially all of the controls of an aircraft.

Among the objects of my invention are to provide an aircraft having a flying wing control unit which comprises substantially all of the controls of an aircraft including such controls as ailerons, of an aircraft including such controls as ailerons, stabilizers, elevators, tail and rudder, and such other objects, advantages and capabilities as are inherently possessed by my invention and which will later more fully appear.

While I have shown herein preferred embodiments of my invention yet I wish it understood that the same are susceptible of modification and change without departing from the spirit of my invention.

Referring more particularly to the drawing, Fig. 1 is a plan view of my aircraft; Fig. 2 is a detailed view of my hinged wing tips; Fig. 3 is a detailed view of my improved rudder mechanism, and Fig. 4 is a front view of another feature of my flying wing.

Referring more particularly to the embodiments selected to illustrate my invention I show the body 10 of an aircraft with a propeller 11 and a flying wing 12. My flying wing 12 is a single unit and surrounds the sides and rear of the body 10 of which it is integral, or attached by suitable means. My flying wing 12 has curved leading edges as shown at 13 and 14 and curving trailing edges 15 and 16. At the sides of my flying wing 12 and as an integral part thereof are rounded wing tips or ailerons 17. I find it desirable to provide hinges 18 for my wing tips 17 so that they may be operable. When the wing tips are turned down they act to lower the landing speed of my aircraft and when the wing tips are turned up by use of my hinges they create greater rising speed.

In sustained flight I may employ either or both of said ailerons and by changing their relative positions they may be used for lateral control.

My flying wing 12 also comprises as an integral part thereof at the rear end at either outer edge a pair of adjustable stabilizers 19. These stabilizers are adjustable to obtain equal lift on both sides of the wing. These stabilizers are not to be used as elevators, but are to retain longitudinal stability and keep the airflow steadily under the wing surface. I also provide as an integral part of my flying wing a pair of elevators 20 on either side of a fixed center rear portion 21. This fixed center rear portion 21 of my flying wing 12 is solid so that the rudder 22 may be extended back to the rear surface of the wing.

My structure also allows for two rudders, one at the top 22 and the other at the bottom 23 of the fixed center rear portion 21 of my flying wing 12 to permit more efficient operation and control, and to reduce torque caused by the action of the propeller 11.

As more clearly shown in Fig. 4 my flying wing 12 may incorporate as a feature thereof a construction to conform to the motion of the air in the slipstream. I particularly show the wing 12 in Fig. 4 at 24 with the leading edge curved up and at 25 with the leading edge curved down. When the propeller 11 is in action it causes an air draft which has more lift on one side and more drop on another side of the wing where the leading edge is straight. To equalize this I curve the nose or entering edge of the wing proportionately as shown for purposes of illustration in Fig. 4. This creates an equal lift on both sides of the wing.

In construction my flying wing, which includes as an integral part thereof the controls above described, is inexpensive of manufacture, and lasting of life. Its operation is immediate and involves greater simplicity than the structures known in the art. It permits higher cruising speed, a minimum landing speed and affords greater safety in operation.

Having thus described my invention, I claim:

An aircraft comprising a motor, a body, a single unit flying wing surrounding and attached to the sides and rear of the body, said flying wing having curved leading and trailing edges, a leading edge of said flying wing on one side of the body lying within the propeller slipstream curved up and a similar portion of the leading edge on the opposite side of said body curved down to conform to the motion of the air in the slipstream so that substantially the same amount of air passes under both sides of the flying wing, a pair of rounded ailerons at either side of and as an integral part of said flying wing, said ailerons hinged so as to be movable downwardly for lower landing speed and upwardly for greater rising speed, a pair of stabilizers as an integral part of the rear outer edges of said flying wing, said stabilizers not for use as elevators but adjustable to have equal lift on both sides of said flying wing and to keep the airflow steadily under the surface of the flying wing for retaining longitudinal stability, a solid fixed center rear portion as an integral part of said flying wing, and a rudder extended back to the rear surface of said flying wing.

RAOUL J. HOFFMAN.